Patented Apr. 2, 1940

2,195,790

UNITED STATES PATENT OFFICE 2,195,790

HYDRAZINES AND PROCESS OF PREPARING SAME

Max Schmid, Riehen, Switzerland, assignor to the firm Society of Chemical Industry in Basle, Basel, Switzerland No Drawing. Application April 26, 1939, Serial No. 270,249. In Switzerland April 9, 1938

4 Claims. (Cl. 260—510)

The present application is a continuation-in-part of my copending application Serial No. 134,452, filed April 1, 1937.

It has been found that new and valuable hydrazine derivatives can be obtained by treating with acylating agents N-sulfo-derivatives of the formula

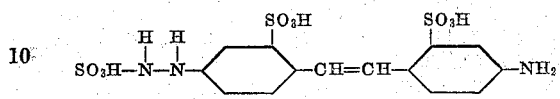

obtainable by careful reduction of compounds of the formula

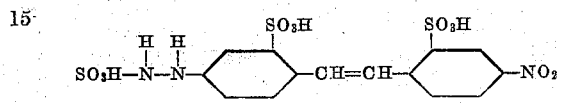

The new acylated hydrazines correspond therefore to the general formula

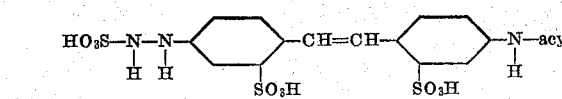

which products are valuable intermediate products for the manufacture of dyestuffs, and which in their free form are light powders which are soluble in water on addition of alkalies and which, when treated with saponifying agents, are converted into products which behave on the one hand like aromatic hydrazines, since they are converted into pyrazolones with $\beta$-keto acids, and on the other hand like amino-compounds of the benzene series, since they contain a diazotizable amino-group.

The following examples illustrate the invention, the parts being by weight:

Example 1

40 parts of 4-nitro-4'-aminostilben-2:2'-disulfonic acid are dissolved in the form of the monosodium salt in 300 parts of water and 13 parts of caustic soda solution of 36° Bé. at 70–80° C. To this solution are added 7 parts of sodium nitrite and the whole is indirectly diazotized after cooling by pouring it into a mixture of 56 parts of hydrochloric acid of 30 per cent strength and 300 parts of ice. The mixture is then stirred for about 1 hour. The suspension of the diazo compound is allowed to run into a mixture of 39 parts of bisulfite liquor (40 per cent of NaHSO₃) and 35 parts of calcined sodium carbonate at 0–10° C. Stirring is continued for about 12 hours at room temperature. There are then added 35 parts of hydrochloric acid of 30 per cent strength until the mixture becomes slightly acid to congo. This solution is added within 2 hours at about 85–95° C. to a reducing liquor consisting of 30 parts of iron filings, 500 parts of water and 3 parts of acetic acid. Stirring is continued for about a further hour and when the reduction is complete, the mixture is made alkaline with 10 parts of calcined sodium carbonate. The whole is filtered hot and allowed to cool to about 20° C., whereupon the solution is made neutral or feebly acid to litmus by addition of acid, for example hydrochloric acid.

This solution of the 4-amino-4'-hydrazinosulfostilben-2:2'-disulfonic acid is treated at 0° C. with 12 parts of acetic acid anhydride. The 4-acetylamino-4'-hydrazinosulfo-stilben-2:2'-disulfonic acid thus formed is very easily soluble, so that it can be obtained in solid form best by evaporating the solution in a vacuum. The sodium salt of this acid corresponds to the formula

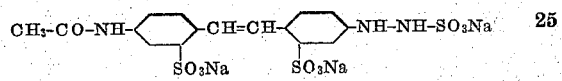

It is a light powder very easily soluble in water. By treating this product with saponifying agents it can be converted into the 4-amino-4'-hydrazinestilben-2:2'-disulfonic acid. The substitution of other anhydrides of aliphatic acids, such as chloroacetic acid anhydride, butyric acid anhydride or propionic acid anhydride, for the acetic acid anhydride leads to compounds which behave similarly. The sodium salt of such a product has for example the formula

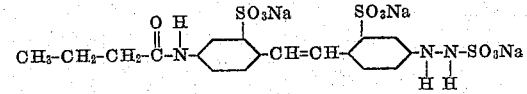

Example 2

40 parts of 4-nitro-4'-aminostilben-2:2'-disulfonic acid are converted into the 4-amino-4'-hydrazino-sulfostilben-2:2'-disulfonic acid as indicated in Example 1 by diazotizing, treating with bisulfite solution and reduction. This solution is filtered hot and allowed to cool to about 20° C., whereupon it is mixed with some ice. At 0–5° C. there are then added in the course of 1 hour 15.4 parts of benzoyl chloride while stirring well.

Stirring is then continued for about 2 hours. The 4-benzoylamino-4'-hydrazino-sulfo-stilben-2:2'-disulfonic acid is partly precipitated and separated by salting out after concentration in a vacuum. The sodium salt of this acid which corresponds to the formula

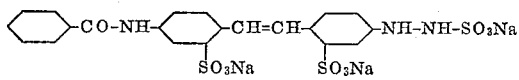

is a light powder easily soluble in water. By treating this product with saponifying agents it can be converted into the 4-amino-4'-hydrazine-stilben-2:2'-disulfonic acid. When replacing the benzoyl chloride by other halides (or also anhydrides) of aromatic acids or acids containing rings, for example the chlorides of the 3- or 4-chlorobenzoic acids, of the phenoxyacetic acids, of the three cresoxyacetic acids, of the phenylacetic acid, of the α-furane-carboxylic acid or of the cyclohexane-carboxylic acid, there are obtained compounds which behave similarly. The sodium salt of such a product has for example the formula

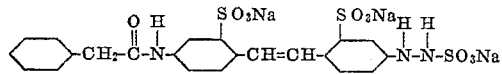

What I claim is:

1. Process for the manufacture of hydrazines, comprising treating N-sulfo-derivatives of the formula

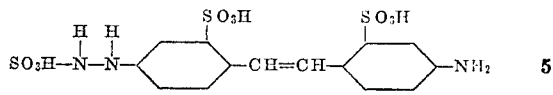

with acylating agents.

2. The acylated hydrazines corresponding in the free state to the general formula

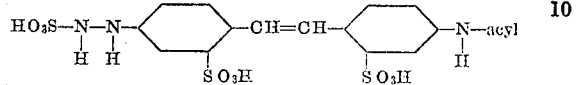

which products, in the form of their sodium salts, are light water-soluble powders which, when treated with saponifying agents, are converted into the product corresponding in the free state to the general formula

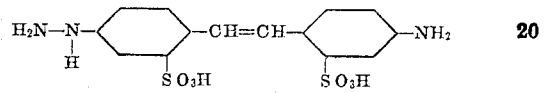

3. The acylated hydrazine corresponding in the free state to the formula

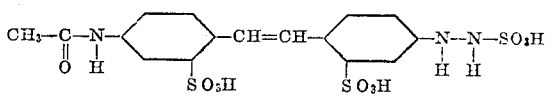

4. The acylated hydrazine corresponding in the free state to the formula

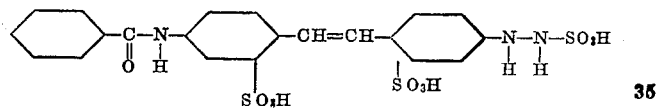

MAX SCHMID.

CERTIFICATE OF CORRECTION.

Patent No. 2,195,790.　　　　　　　　　　　　　　April 2, 1940.

MAX SCHMID.

It is hereby certified that error appears in the above numbered patent requiring correction as follows: In the heading to the printed specification, line 8 thereof, for the foreign filing date "April 9, 1938" read --April 9, 1936--; and that the said Letters Patent should be read with this correction therein that the same may conform to the record of the case in the Patent Office.

Signed and sealed this 30th day of September, A. D. 1941.

Henry Van Arsdale,
　　　　　　　　　　　　　　　　　　　Acting Commissioner of Patents.

(Seal)